United States Patent
Chen et al.

(10) Patent No.: US 8,372,532 B2
(45) Date of Patent: Feb. 12, 2013

(54) SECONDARY BATTERY MODULE AND COMPOSITE ARTICLE THEREOF

(75) Inventors: Kuo-Huey Chen, Troy, MI (US); Taeyoung Han, Bloomfield Hills, MI (US); Bahram Khalighi, Troy, MI (US); Chih-Cheng Hsu, Rochester Hills, MI (US); Herman K. Phlegm, Oak Park, MI (US); Robert D. Drexler, Clawson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 309 days.

(21) Appl. No.: 12/773,182

(22) Filed: May 4, 2010

(65) Prior Publication Data

US 2011/0274957 A1    Nov. 10, 2011

(51) Int. Cl.
 *H01M 10/50* (2006.01)
(52) U.S. Cl. ........................................ 429/120; 165/185
(58) Field of Classification Search .................. 429/120; 165/185
See application file for complete search history.

(56) References Cited

U.S. PATENT DOCUMENTS

2006/0164795 A1* 7/2006 Jones et al. .................... 361/600
2006/0225874 A1* 10/2006 Shives et al. .................. 165/185

FOREIGN PATENT DOCUMENTS

DE    102008044162 A1    6/2010
WO       2010112468 A1    10/2010

* cited by examiner

*Primary Examiner* — Jane Rhee
(74) *Attorney, Agent, or Firm* — Quinn Law Group, PLLC

(57) ABSTRACT

A composite article for dissipating thermal energy from a secondary battery cell includes a first graphite layer, a second graphite layer spaced away from and arranged parallel to the first graphite layer, and a metal layer sandwiched between and disposed in contact with each of the first graphite layer and the second graphite layer. The composite article has a thermal conductivity of greater than or equal to about 1,200 W/mK and an electrical conductivity of greater than or equal to about 10,000 S/cm. A secondary battery module includes the composite article and a secondary battery cell having a length and an average measurable temperature along the length during operation of the secondary battery module. The composite article is disposed adjacent and in contact with the secondary battery cell to thereby dissipate thermal energy from the secondary battery cell during operation of the secondary battery module.

15 Claims, 3 Drawing Sheets

SECONDARY BATTERY MODULE AND COMPOSITE ARTICLE THEREOF

TECHNICAL FIELD

The present disclosure relates to a secondary battery module and a composite article thereof.

BACKGROUND OF THE INVENTION

Batteries are useful for converting chemical energy into electrical energy, and may be described as primary or secondary. Primary batteries are generally non-rechargeable, whereas secondary batteries are readily rechargeable and may be restored to a full charge after use. As such, secondary batteries may be useful for applications such as powering electronic devices, tools, machinery, and vehicles. For example, secondary batteries for vehicle applications may be recharged external to the vehicle via a plug-in electrical outlet, or onboard the vehicle via a regenerative event.

A secondary battery, which may also be known as a secondary battery pack, may include one or more secondary battery modules. Similarly, a secondary battery module may include one or more secondary battery cells positioned adjacent to each other, e.g., stacked. When such secondary batteries are charged or discharged, heat is produced. If uncontrolled, such heat can detrimentally impact the life and performance of the secondary battery and/or individual secondary battery cells. Therefore, maintaining an even temperature distribution within the secondary battery cells in order to operate the secondary battery within a desired operating temperature range is essential to maximizing the performance and longevity of the secondary battery.

SUMMARY OF THE INVENTION

A composite article for dissipating thermal energy from a secondary battery cell includes a first graphite layer, a second graphite layer spaced away from and arranged parallel to the first graphite layer, and a metal layer sandwiched between and disposed in contact with each of the first graphite layer and the second graphite layer. The composite article has a thermal conductivity of greater than or equal to about 1,200 W/mK and an electrical conductivity of greater than or equal to about 10,000 S/cm.

A secondary battery module configured for operation by electron transfer includes the composite article and a secondary battery cell having a length and an average measurable temperature along the length during operation of the secondary battery module. The composite article is disposed adjacent and in contact with the secondary battery cell to thereby dissipate thermal energy from the secondary battery cell during operation of the secondary battery module.

In one variation, a secondary battery module includes a plurality of secondary battery cells each having a length and an average measurable temperature along the length. Further, each of the secondary battery cells is spaced away from and arranged parallel to an adjacent one of the secondary battery cells. The plurality of secondary battery cells includes a first one of the secondary battery cells having an average measurable first temperature during operation of the secondary battery module, and a terminal one of the secondary battery cells having an average measurable terminal temperature during operation of the secondary battery module. The terminal one of the secondary battery cells is separated from the first one of the secondary battery cells by at least one other of the secondary battery cells. The secondary battery module further includes a plurality of composite articles, wherein each of the composite articles is disposed adjacent and in contact with at least one of the secondary battery cells to thereby dissipate thermal energy from the at least one of the secondary battery cells during operation of the secondary battery module.

The composite article provides excellent temperature control for the secondary battery cell and secondary battery module. That is, the composite article dissipates thermal energy from the secondary battery cell during operation, e.g., during charging and discharging of the secondary battery module. Additionally, the composite article is durable, structurally rigid and strong, and compatible with various heat sinks. Therefore, the secondary battery module exhibits excellent performance and longevity.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
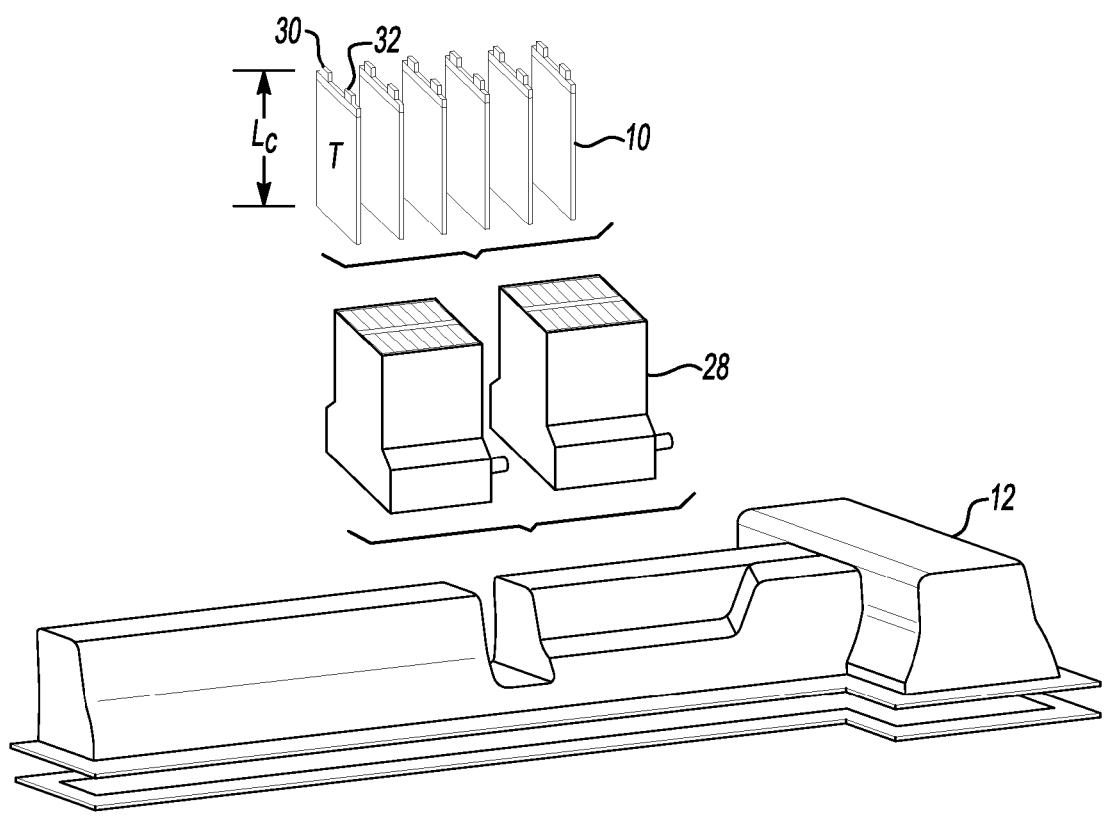
FIG. 1 is an exploded schematic perspective view of a secondary battery and components thereof, including a plurality of secondary battery cells and a plurality of secondary battery modules.
Figure 2:
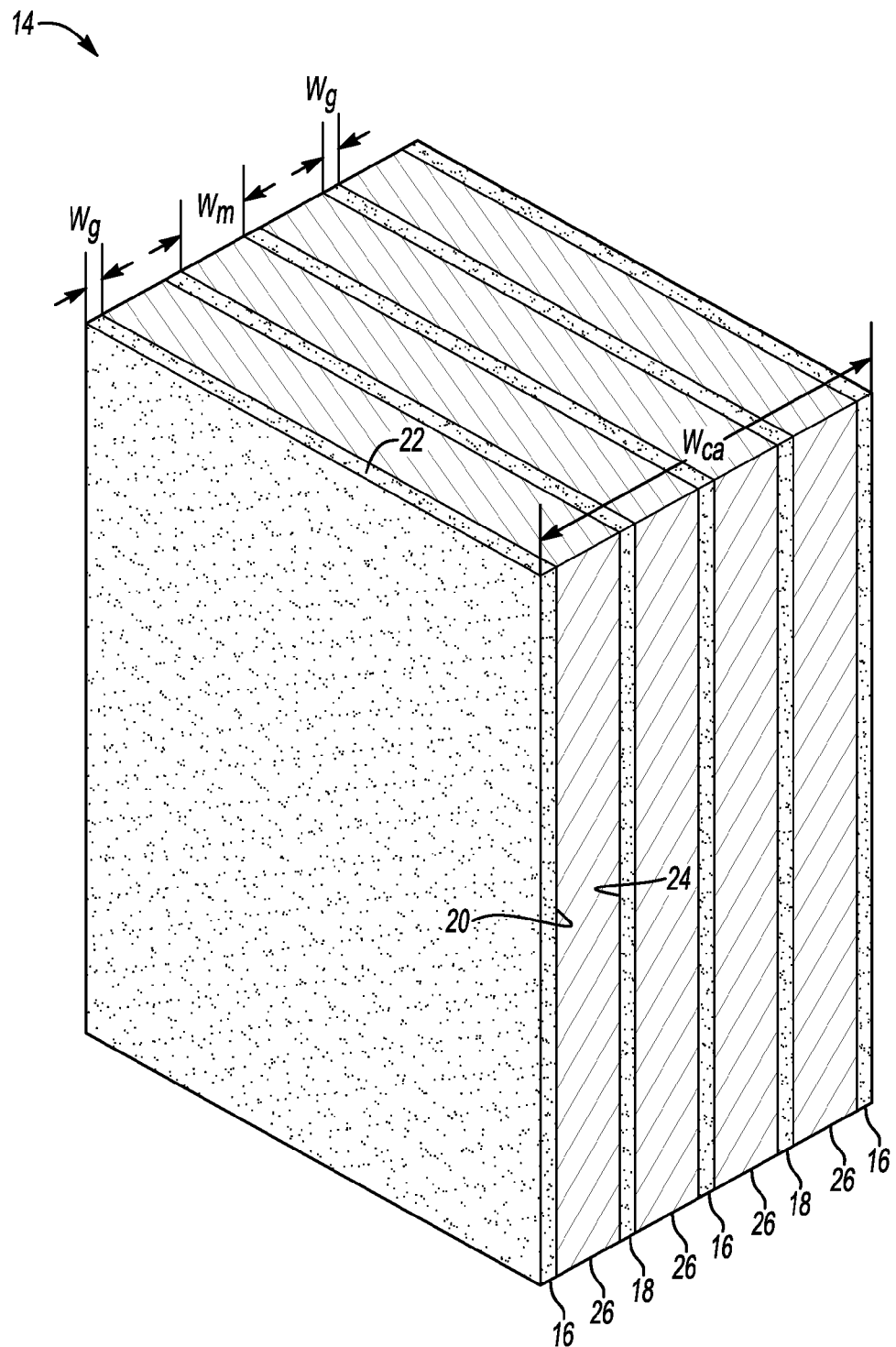
FIG. 2 is a schematic magnified perspective view of a composite article for dissipating thermal energy from a secondary battery cell of FIG. 1.

Referring to the Figures, wherein like reference numerals indicate like elements, a composite article for dissipating thermal energy from a secondary battery cell 10 (FIG. 1) of a secondary battery 12 (FIG. 1) is shown generally at 14 in FIG. 2. That is, the composite article 14 is configured for cooling the secondary battery cell 10 during operation, as set forth in more detail below. Therefore, the composite article 14 may be useful for a variety of applications requiring secondary battery cells 10, such as, but not limited to, electronic devices, tools, machinery, and vehicles. For example, the composite article 14 may be useful for lithium ion secondary batteries cells 10 for electric and hybrid electric vehicles. However, it is to be appreciated that the composite article 14 may also be useful for non-automotive applications, such as, but not limited to, household and industrial power tools and electronic devices.

Referring to FIG. 2, the composite article 14 includes a first graphite layer 16 and a second graphite layer 18. As used herein, the terminology "graphite" refers to an allotrope of carbon in which carbon atoms are arranged in a lattice. Each of the first graphite layer 16 and the second graphite layer 18 provide excellent thermal conductivity and electrical conductivity to the composite article 14, as set forth in more detail below. Each of the first graphite layer 16 and the second graphite layer 18 may be formed from any suitable type or form of graphite. For example, each of the first graphite layer 16 and the second graphite layer 18 may be formed from crystalline flake graphite, amorphous graphite, lump graphite, highly ordered pyrolytic graphite, and combinations thereof. Likewise, each of the first graphite layer 16 and the second graphite layer 18 may be formed from an alpha graphite having a hexagonal lattice or a beta graphite having a rhombohedral lattice. Further, each of the first graphite layer 16 and the second graphite layer 18 may be formed from the same source of graphite, e.g., a roll of graphite sheeting. Alternatively, each of the first graphite layer 16 and the second graphite layer 18 may be formed from different sources of graphite. Moreover, each of the first graphite layer 16 and the second graphite layer 18 may not substantially absorb water.

As shown in FIG. 2, the second graphite layer 18 is spaced away from and arranged parallel to the first graphite layer 16. That is, a face 20, rather than an end 22, of the first graphite layer 16 may be substantially parallel to and spaced from a similar face 24 of the second graphite layer 18.

Referring again to FIG. 2, the composite article 14 also includes a metal layer 26 sandwiched between and disposed in contact with each of the first graphite layer 16 and the second graphite layer 18. That is, the metal layer 26 may be sandwiched between the first graphite layer 16 and the second graphite layer 18 so that the metal layer 26 contacts the respective faces 20, 24 of each of the first graphite layer 16 and the second graphite layer 18.

The metal layer 26 may be bonded to each of the first graphite layer 16 and the second graphite layer 18. By way of a non-limiting example, the metal layer 26 may be adhered to each of the first graphite layer 16 and the second graphite layer 18 by an adhesive. Alternatively or additionally, the metal layer 26 may be bonded to each of the first graphite layer 16 and the second graphite layer 18 by compression and/or an interference fit.

The metal layer 26 may be selected from metals having suitable thermal conductivity and electrical conductivity for a desired application. For example, the metal layer 26 may include an element selected from the group of aluminum, copper, and combinations thereof. The metal layer 26 provides excellent structural rigidity and support to each of the first graphite layer 16 and the second graphite layer 18. That is, the metal layer 26 compensates for any brittleness of each of the first graphite layer 16 and the second graphite layer 18 and contributes to the durability of the composite article 14.

The metal layer 26 may be present in the composite article 14 in an amount of from about 10 parts by weight to about 90 parts by weight based on 100 parts by weight of the composite article 14. For example, the metal layer 26 may be present in the composite article 14 in an amount of from about 70 parts by weight to about 80 parts by weight based on 100 parts of the composite article 14. That is, in one non-limiting example, the first graphite layer 16 and the second graphite layer 18 may be present together in the composite article 14 in an amount of from about 20 parts by weight to about 30 parts by weight based on 100 parts by weight of the composite article 14.

Referring again to FIG. 2, in one variation, the composite article 14 may include a plurality of first graphite layers 16 and a plurality of second graphite layers 18, wherein each one of the second graphite layers 18 is spaced away from and arranged parallel to at least one of the first graphite layers 16. That is, the plurality of first graphite layers 16 may alternate with the plurality of the second graphite layers 18 along a thickness, $w_{ca}$, of the composite article 14.

With continued reference to FIG. 2, in this variation, the composite article 14 may further include a plurality of metal layers 26, wherein each of the metal layers 26 is sandwiched between and disposed in contact with exactly one of the first graphite layers 16 and exactly one of the second graphite layers 18. That is, each of the metal layers 26 may be sandwiched between exactly one of the first graphite layers 16 and exactly one of the second graphite layers 18. For example, the composite article 14 may include exactly four metal layers 26 to form a configuration along the thickness, $w_{ca}$, of the composite article 14 that may be represented by sequence (1)

$$G_1\text{-}M\text{-}G_2M\text{-}G_1M\text{-}G_2\text{-}M\text{-}G_1 \tag{1}$$

wherein $G_1$ represents each of the first graphite layers 16, M represents each of the metal layers 26, and $G_2$ represents each of the second graphite layers 18. However, the composite article 14 may include any suitable number of metal layers 26, e.g., less than four metal layers 26 or more than four metal layers 26, according to size and/or voltage requirements of a desired application.

The thickness, $w_{ca}$, of the composite article 14, and a thickness, $w_g$, of each of the first graphite layer 16 and the second graphite layer 18, may be selected according to a desired application. In the non-limiting example of the secondary battery application, the composite article 14 may have a thickness, $w_{ca}$, of from about 0.5 mm to about 1.5 mm, e.g., about 1 mm. Therefore, each of the first graphite layer 16 and the second graphite layer 18 may have a thickness, $w_g$, of from about 0.04 mm to about 0.08 mm, e.g., about 0.06 mm, and the metal layer 26 may have a thickness, $w_m$, of from about 0.1 mm to about 0.3 mm, e.g., about 0.175 mm. Therefore, for the variation of the composite article 14 including exactly four metal layers 26, in one example, each of the metal layers 26 may have a thickness, $w_m$, of about 0.2 mm, while each of the first graphite layer 16 and the second graphite layer 18 may have a thickness, $w_g$, of about 0.04 mm. In another example, each of the metal layers 26 may have a thickness, $w_m$, of about 0.175 mm, while each of the first graphite layer 16 and the second graphite layer 18 may have a thickness, $w_g$, of about 0.06 mm.

The composite article 14 has a thermal conductivity of greater than or equal to about 1,200 W/mK at 273 K and an electrical conductivity of greater than or equal to about 10,000 S/cm. That is, without intending to be limited by theory, the first graphite layer 16 and the second graphite layer 18 increase the thermal conductivity and electrical conductivity of the composite article 14. Therefore, since the composite article 14 includes each of the first graphite layer 16, the second graphite layer 18, and the metal layer 26, the composite article 14 is useful for applications requiring excellent structural rigidity and thermal and electrical conductivity.

Referring again to FIGS. 1 and 3, a secondary battery module configured for operation by electron transfer is shown generally at 28. In particular, during operation of the secondary battery module 28, a chemical redox reaction may transfer electrons from a region of relatively negative potential (not shown) to a region of relatively positive potential (not shown) to thereby cycle, i.e., charge and discharge, the secondary battery 12 to provide voltage to power applications.

The secondary battery module 28 may be useful for automotive applications, such as for a plug-in hybrid electric vehicle (PHEV). For example, the secondary battery module 28 may be a lithium ion secondary battery module 28. Referring to FIG. 1, a plurality of secondary battery modules 28 may be combined to form the secondary battery 12, i.e., the secondary battery pack. That is, although the secondary battery module 28 is shown at a different angle in FIG. 3 than in FIG. 1, the secondary battery module 28 may be connected to one or more other secondary battery modules 28 to form the secondary battery 12 (FIG. 1). By way of example, the secondary battery module 28 may be sufficiently sized to provide a necessary voltage for powering a hybrid electric vehicle (HEV), an electric vehicle (EV), a plug-in hybrid electric vehicle (PHEV), and the like, e.g., approximately 300 to 400 volts or more, depending on the required application.

Referring again to FIG. 1, the secondary battery module 28 includes a secondary battery cell 10. The secondary battery cell 10 may be any suitable electrochemical battery cell. For example, the secondary battery cell 10 may be lithium ion, lithium ion polymer, lithium iron phosphate, lithium vanadium pentoxide, lithium copper chloride, lithium manganese dioxide, lithium sulfur, lithium titanate, nickel metal hydride, nickel cadmium, nickel hydrogen, nickel iron, sodium sulfur, vanadium redox, lead acid, and combinations thereof.

Further, as shown in FIG. 1, the secondary battery cell 10 may have a positive cell tab 30 and a negative cell tab 32, and the secondary battery cell 10 may be suitable for stacking That is, the secondary battery cell 10 may be formed from a heat-sealable, flexible foil that is sealed to enclose a cathode, an anode, and a separator (not shown). Therefore, any number of secondary battery cells 10 may be stacked or otherwise placed adjacent to each other to form a cell stack, i.e., the secondary battery module 28. The actual number of secondary battery cells 10 may be expected to vary with the required voltage output of each secondary battery module 28. Likewise, the number of interconnected secondary battery modules 28 may vary to produce the necessary total output voltage for a specific application.

Referring again to FIG. 1, the secondary battery cell 10 has a length, $L_c$, and an average measurable temperature, T, along the length, $L_c$, during operation of the secondary battery module 28. For example, the average measurable temperature, T, of the secondary battery cell 10 may be from about 298 K to about 313 K during operation of the secondary battery module 28.

Figure 3:
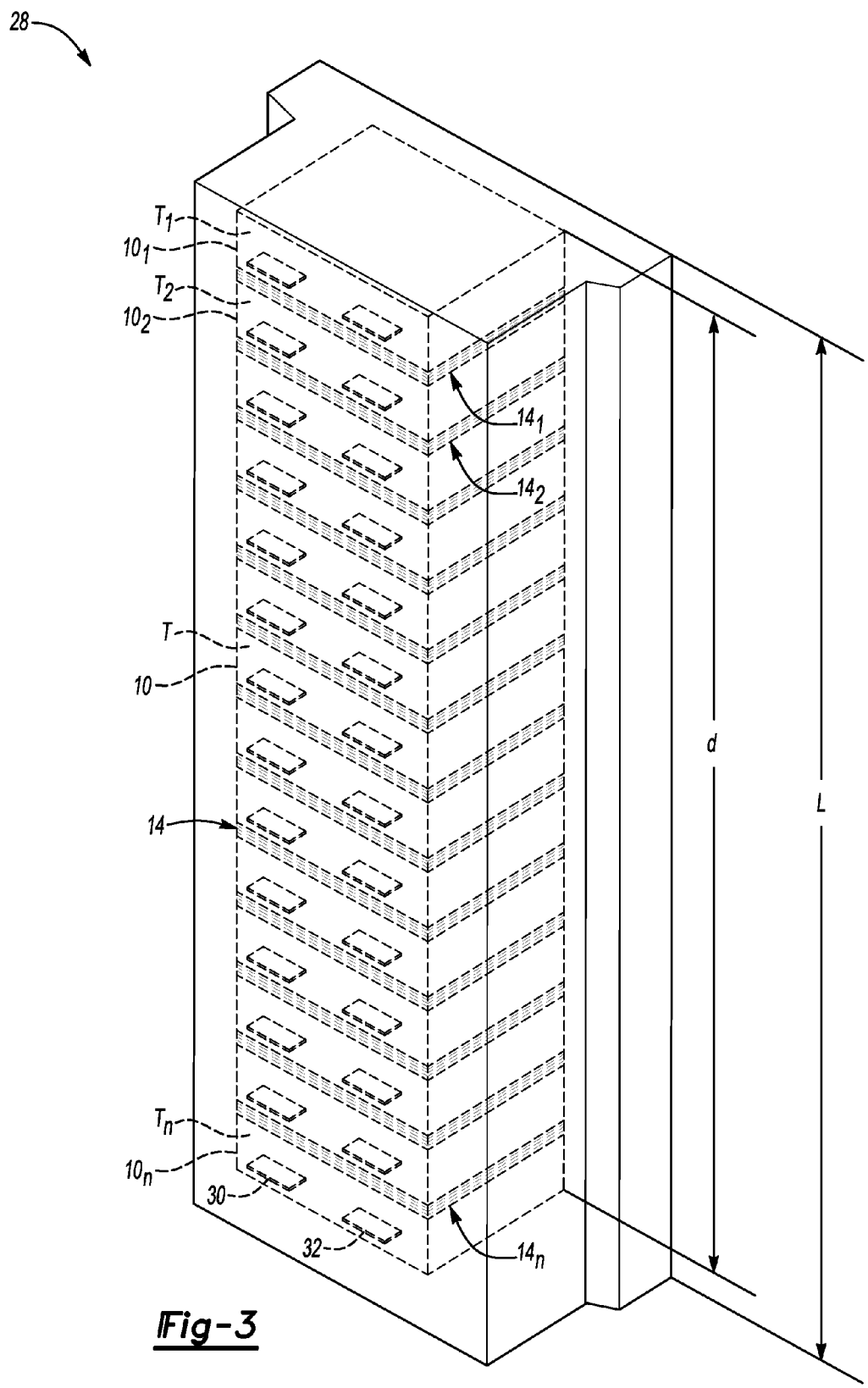
FIG. 3 is a schematic perspective view of one secondary battery module of FIG. 1 including the composite article of FIG. 2.

Referring now to FIG. 3, the secondary battery module 28 also includes the composite article 14, including at least one of each of the first graphite layer 16 (FIG. 2), the metal layer 26 (FIG. 2), and the second graphite layer 18 (FIG. 2), as set forth above. The composite article 14 is disposed adjacent and in contact with the secondary battery cell 10 to thereby dissipate thermal energy from the secondary battery cell 10 during operation of the secondary battery module 28, as set forth in more detail below.

Stated differently, the composite article 14 may function as a cooling plate for the secondary battery cell 10. In particular, since the composite article 14 includes each of the first graphite layer 16 (FIG. 2) and the second graphite layer 18 (FIG. 2), and since the composite article 14 is disposed adjacent and in contact with the secondary battery cell 10, the composite article 14 effectively and efficiently dissipates thermal energy from the secondary battery cell 10, e.g., by conduction. The composite article 14 may dissipate thermal energy from the secondary battery cell 10 to any suitable heat sink (not shown) internal or external to the secondary battery module 28, e.g., a super cooled liquid or a heat pump. Therefore, the average measurable temperature, T, of the secondary battery cell 10 may not vary by more than about 15 K during operation of the secondary battery module 28 so that the secondary battery 12 (FIG. 1) may operate within a temperature range of from about 298 K to about 313 K. Consequently, the composite article 14 provides excellent cooling of the secondary battery cell 10, minimizes uneven temperature distribution within the secondary battery cell 10, and thereby provides a substantially uniform temperature distribution across the length, $L_c$, (FIG. 1) of secondary battery cell 10.

Further, the average measurable temperature, T, of the secondary battery cell 10 may decrease as an amount of the metal layer 26 present in the composite article 14 decreases. For example, a secondary battery cell 10 including the metal layer 26 present in an amount of about 80 parts by weight based on 100 parts by weight of the composite article 14 may have a generally higher average measureable temperature, T, than a comparable secondary battery cell 10 including the metal layer 26 present in an amount of about 70 parts by weight based on 100 parts by weight of the composite article 14. Therefore, without intending to be limited by theory, variations including comparatively higher amounts of each of the first graphite layer 16 and the second graphite layer 18 dissipate thermal energy more effectively from the secondary battery cell 10.

Referring again to FIGS. 1 and 3, in one variation, the secondary battery module 28 includes a plurality of secondary battery cells 10 each having a length, $L_c$, (FIG. 1) and an average measurable temperature, T, along the length, $L_c$, (FIG. 1) and each spaced away from and arranged parallel to an adjacent one of the secondary battery cells 10. That is, referring to FIG. 3, the plurality of secondary battery cells 10 includes a first one of the secondary battery cells $10_1$ having an average measurable first temperature, $T_1$, during operation of the secondary battery module 28, and a terminal one of the secondary battery cells $10_n$ having an average measurable terminal temperature, $T_n$, during operation of the secondary battery module 28. The terminal one of the secondary battery cells $10_n$ is separated from the first one of the secondary battery cells $10_1$ by at least one other of the secondary battery cells 10, $10_1$, $10_n$. Therefore, in this variation, the secondary battery module 28 includes at least three secondary battery cells 10. However, the secondary battery module 28 may include any suitable number of secondary battery cells 10, e.g., from about 3 to about 100 secondary battery cells 10.

Further, the secondary battery cells 10 may be connected in series to provide the desired voltage of the secondary battery module 28 and/or secondary battery 12 (FIG. 1). And, as shown in FIG. 3, a distance, d, between the first one of the secondary battery cells $10_1$ and the terminal one of the secondary battery cells $10_n$ may be from about 0.5 m to about 2 m.

Referring again to FIG. 3, in this variation, the secondary battery module 28 also includes a plurality of composite articles 14, wherein each of the composite articles 14 is disposed adjacent and in contact with at least one of the secondary battery cells 10 to thereby dissipate thermal energy from the at least one of the secondary battery cells 10 during operation of the secondary battery module 28. That is, as shown in FIG. 3, a first composite article $14_1$ may be sandwiched between the first one of the secondary battery cells $10_1$ and an adjacent one of the secondary battery cells $10_2$ so that the first composite article $14_1$ contacts each of the first one of the secondary battery cells $10_1$ and second one of the secondary battery cells $10_2$. Likewise, a second composite article $14_2$ and a terminal composite article $14_n$ may each be sandwiched between respective adjacent secondary battery cells 10. That is, the plurality of secondary battery cells 10 may alternate in order with the plurality of the composite articles 14 to form, for example, a configuration along the length, L, of the secondary battery module 28 that may be represented by sequence (2)

$$\text{SBC-CA-SBC-CA- . . . -SBC} \quad (2)$$

wherein SBC represents each of the secondary battery cells 10 and CA represents each of the composite articles 14.

Further, although not shown in FIG. 3, the plurality of secondary battery cells 10 and the plurality of composite articles 14 may be arranged in any suitable configuration. That is, as long as each of the composite articles 14 is disposed adjacent and in contact with at least one of the secondary battery cells 10, the combination of the secondary battery cells 10 and composite articles 14 may be arranged in a single row (as shown in FIG. 3) or in a plurality of adjacent rows (not shown).

During operation, since each composite article 14 dissipates thermal energy via contact with one or more secondary battery cells 10, a difference, ΔT, between the average measurable first temperature, $T_1$, of the first one of the secondary battery cells $10_1$ and the average measurable terminal temperature, $T_n$, of the terminal one of the secondary battery cells $10_n$ may be less than or equal to about 8 K during operation of the secondary battery module 28. Stated differently, the secondary battery module 28 has a substantially uniform average measurable temperature, T, both within each secondary battery cell 10, i.e., along the length, $L_c$, (FIG. 1) of each secondary battery cell 10, and between adjacent secondary battery cells 10.

In particular, the average measurable temperature, T, of each of the secondary battery cells 10 may be from about 298 K to about 313 K, e.g., from about 298 K to about 308 K, during operation of the secondary battery module 28. That is, the average measurable temperature, T, of the plurality of secondary battery cells 10 may not vary by more than about 15 K so that the secondary battery 12 (FIG. 1) including multiple secondary battery cells 10 may operate within the temperature range of from about 298 K to about 313 K during operation. Therefore, the composite article 14 provides excellent cooling and substantially uniform temperature distribution across the secondary battery cells 10, and thereby minimizes uneven temperature distribution within the secondary battery module 28.

The composite article 14 provides excellent temperature control for the secondary battery cell 10 and secondary battery module 28. That is, the composite article 14 dissipates thermal energy from the secondary battery cell 10 during operation, e.g., during charging and discharging of the secondary battery module 28, and thereby minimizes the average measureable temperature, T, of the secondary battery cell 10 and an operating temperature of the secondary battery module 28. Moreover, the composite article 14 maximizes temperature uniformity within the secondary battery cell 10 along the length, $L_c$, (FIG. 1) of the secondary battery cell 10. Additionally, the composite article 14 is durable, structurally rigid and strong, and compatible with various heat sinks Therefore, the secondary battery module 28 exhibits excellent performance and longevity.

While the best modes for carrying out the invention have been described in detail, those familiar with the art to which this invention relates will recognize various alternative designs and embodiments for practicing the invention within the scope of the appended claims.

The invention claimed is:

1. A composite article for dissipating thermal energy from a secondary battery cell, the composite article comprising:
   a first graphite layer;
   a second graphite layer spaced away from and arranged parallel to said first graphite layer; and
   a metal layer sandwiched between and disposed in contact with each of said first graphite layer and said second graphite layer;
   wherein the composite article has a thermal conductivity of greater than or equal to about 1,200 W/mK and an electrical conductivity of greater than or equal to about 10,000 S/cm;
   wherein each of said first graphite layer and said second graphite layer has a thickness of from about 0.04 mm to about 0.06 mm;
   wherein said metal layer has a thickness of from about 0.1 mm to about 0.3 mm; and
   wherein the composite article has a thickness of from about 0.5 mm to about 1.5 mm.

2. The composite article of claim 1, wherein said metal layer is bonded to each of said first graphite layer and said second graphite layer.

3. The composite article of claim 1, wherein said metal layer is present in the composite article in an amount of from about 10 parts by weight to about 90 parts by weight based on 100 parts by weight of the composite article.

4. The composite article of claim 1, wherein said metal layer is present in the composite article in an amount of from about 70 parts by weight to about 80 parts by weight based on 100 parts by weight of the composite article.

5. The composite article of claim 1, wherein said metal layer includes an element selected from the group of aluminum, copper, and combinations thereof.

6. The composite article of claim 1, further including a plurality of first graphite layers and a plurality of second graphite layers, wherein each one of said second graphite layers is spaced away from and arranged parallel to at least one of said first graphite layers.

7. The composite article of claim 6, further including a plurality of metal layers, wherein each of said metal layers is sandwiched between and disposed in contact with exactly one of said first graphite layers and exactly one of said second graphite layers.

8. The composite article of claim 7, further including exactly four metal layers.

9. The composite article of claim 7, wherein each of said first graphite layer and said second graphite layer has a thickness of about 0.06 mm.

10. The composite article of claim 9, wherein each of said metal layers has a thickness of about 0.175 mm.

11. A secondary battery module configured for operation by electron transfer, the secondary battery module comprising:
    a secondary battery cell having a length and an average measurable temperature along said length during operation of the secondary battery module; and
    a composite article disposed adjacent and in contact with said secondary battery cell to thereby dissipate thermal energy from said secondary battery cell during operation of the secondary battery module, wherein said composite article includes:
    a first graphite layer;
    a second graphite layer spaced away from and arranged parallel to said first graphite layer; and
    a metal layer sandwiched between and disposed in contact with each of said first graphite layer and said second graphite layer;
    wherein each of said first graphite layer and said second graphite layer has a thickness of from about 0.04 mm to about 0.06 mm;
    wherein said metal layer has a thickness of from about 0.1 mm to about 0.3 mm; and
    wherein said composite article has a thickness of from about 0.5 mm to about 1.5 mm.

12. The secondary battery module of claim 11, wherein said average measurable temperature of said secondary battery cell is from about 298 K to about 313 K during operation of the secondary battery module.

13. A secondary battery module configured for operation by electron transfer, the secondary battery module comprising:

a plurality of secondary battery cells each having a length and an average measurable temperature along said length and each spaced away from and arranged parallel to an adjacent one of said secondary battery cells, wherein said plurality of secondary battery cells includes a first one of said secondary battery cells having an average measurable first temperature during operation of the secondary battery module, and a terminal one of said secondary battery cells having an average measurable terminal temperature during operation of the secondary battery module and separated from said first one of said secondary battery cells by at least one other of said secondary battery cells; and a plurality of composite articles, wherein each of said composite articles is disposed adjacent and in contact with at least one of said secondary battery cells to thereby dissipate thermal energy from said at least one of said secondary battery cells during operation of the secondary battery module and includes;

a first graphite layer;

a second graphite layer spaced away from and arranged parallel to said first graphite layer; and a metal layer sandwiched between and disposed in contact with each of said first graphite layer and said second graphite layer;

wherein each of said first graphite layer and said second graphite layer has a thickness of from about 0.04 mm to about 0.06 mm;

wherein said metal layer has a thickness of from about 0.1 mm to about 0.3 mm; and wherein each of said composite articles has a thickness of from about 0.5 mm to about 1.5 mm.

14. The secondary battery module of claim 13, wherein said average measurable temperature of each of said secondary battery cells is from about 298 K to about 313 K.

15. The secondary battery module of claim 14, wherein a difference between said average measurable first temperature and said average measurable terminal temperature is less than or equal to about 8 K.

* * * * *